July 3, 1956   J. A. LASATER ET AL   2,752,646
SPRUE REAMING FACILITIES FOR MOLD ASSEMBLING INSTALLATION
Filed May 28, 1952   10 Sheets-Sheet 1

INVENTORS
John A. Lasater
Thomas A. Deakins
BY
R. H. Bryant
ATTORNEY

July 3, 1956     J. A. LASATER ET AL     2,752,646
SPRUE REAMING FACILITIES FOR MOLD ASSEMBLING INSTALLATION
Filed May 28, 1952     10 Sheets-Sheet 2
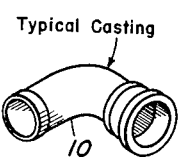
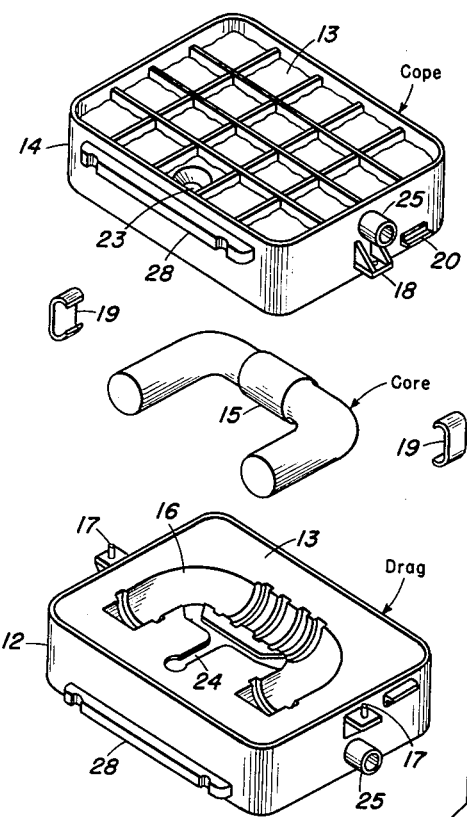
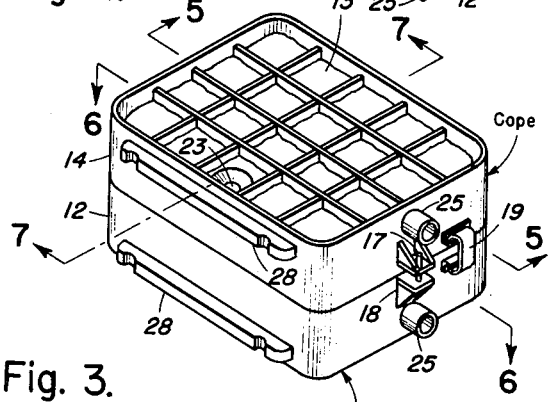
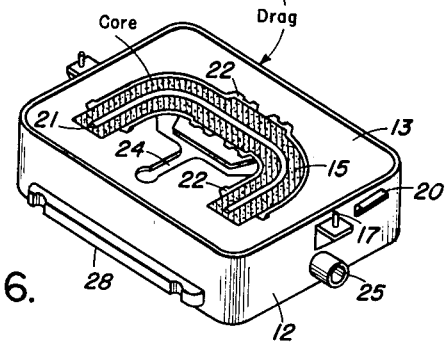
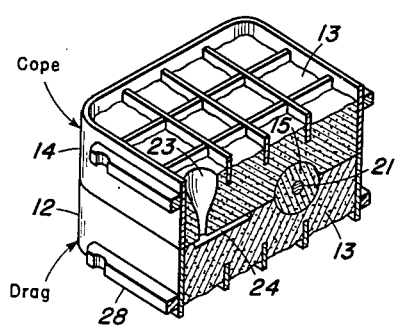
INVENTORS
John A. Lasater
BY Thomas A. Deakins
ATTORNEY

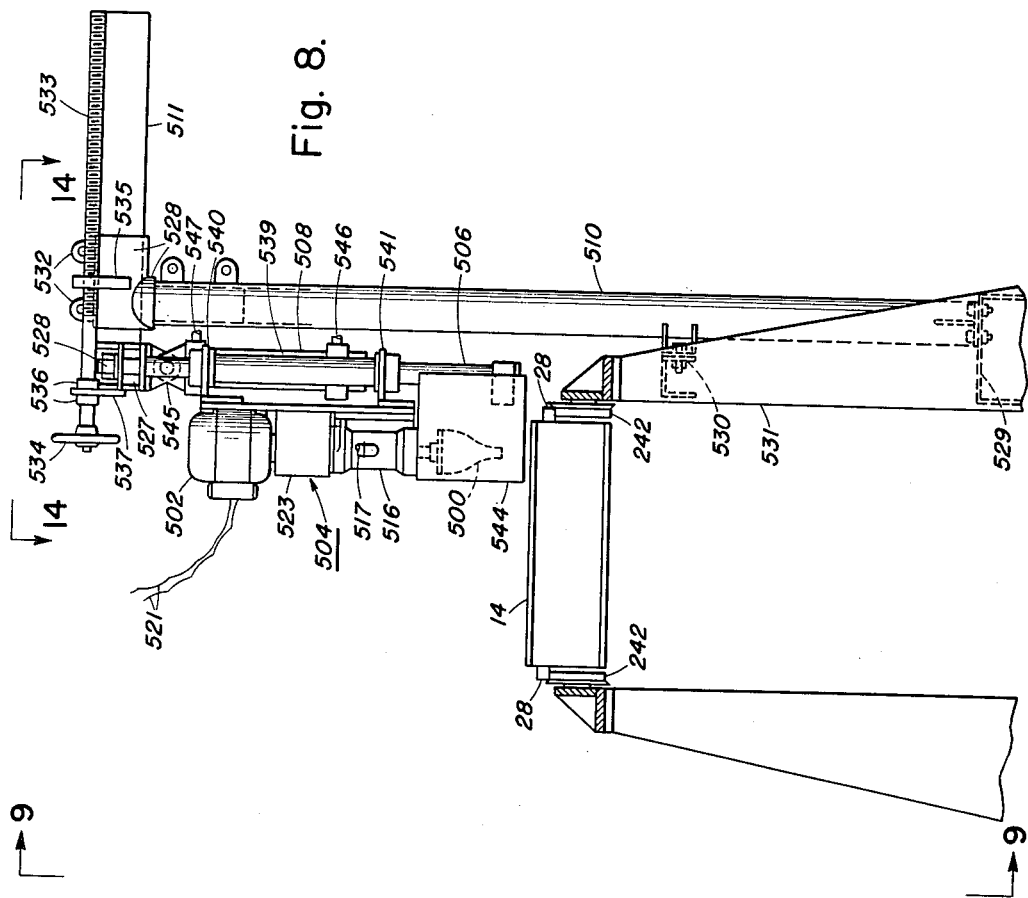
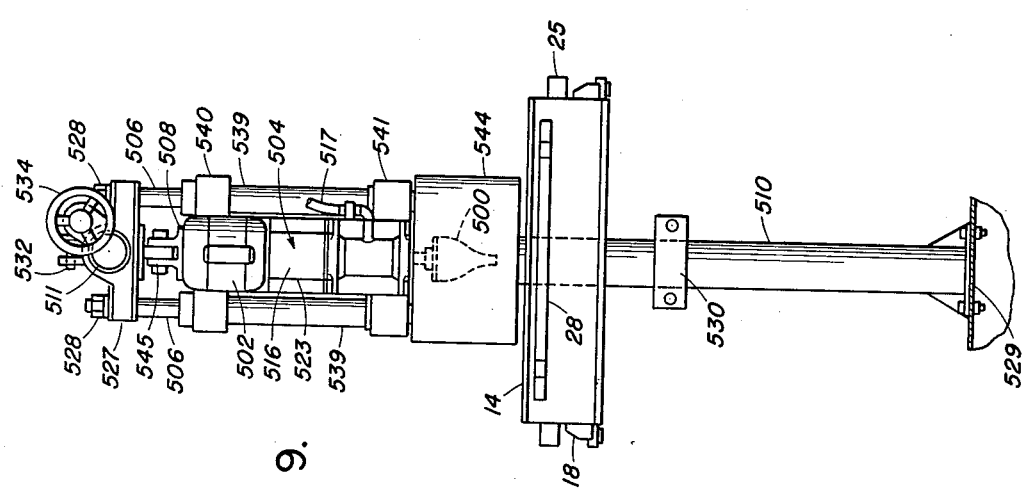

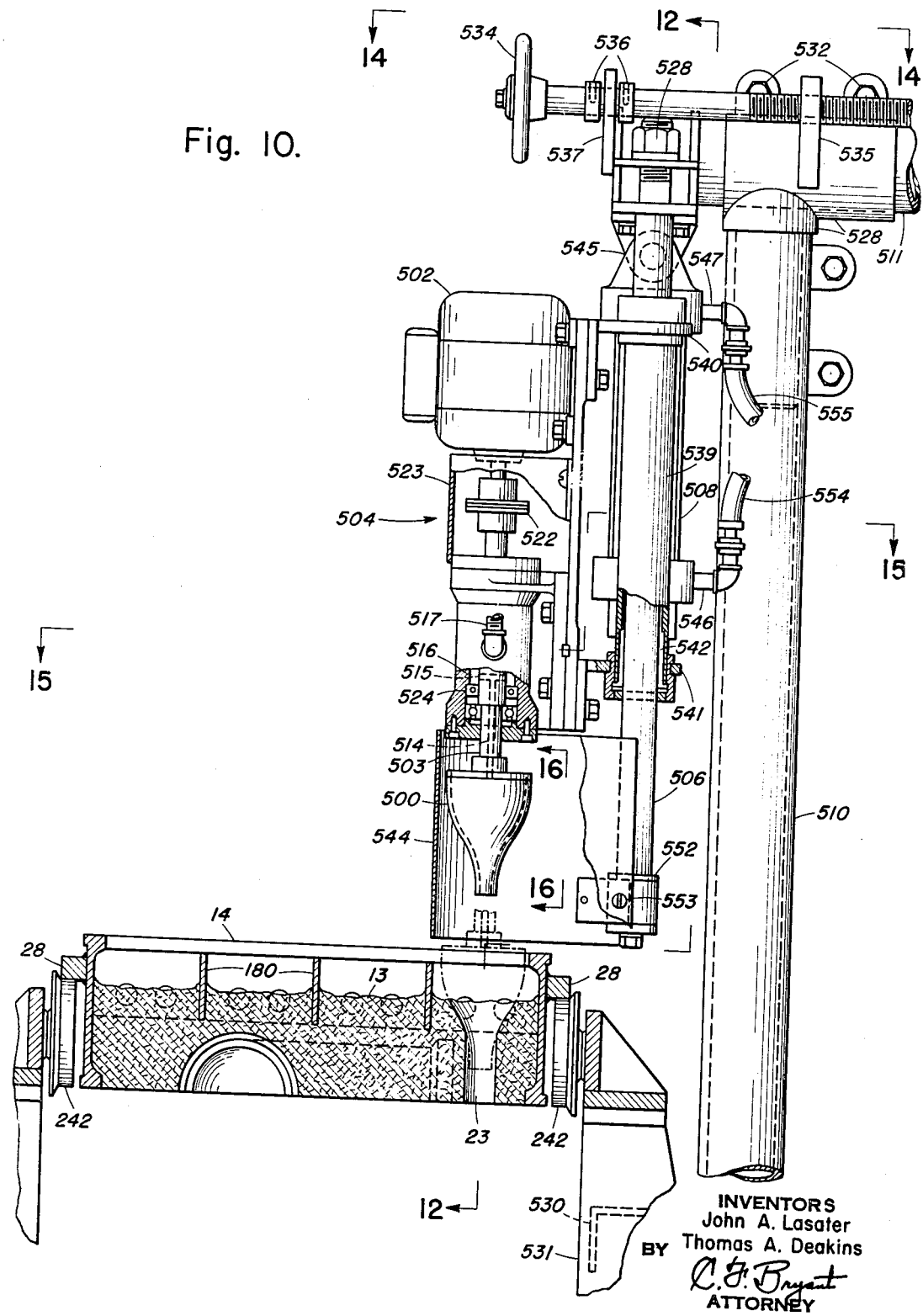

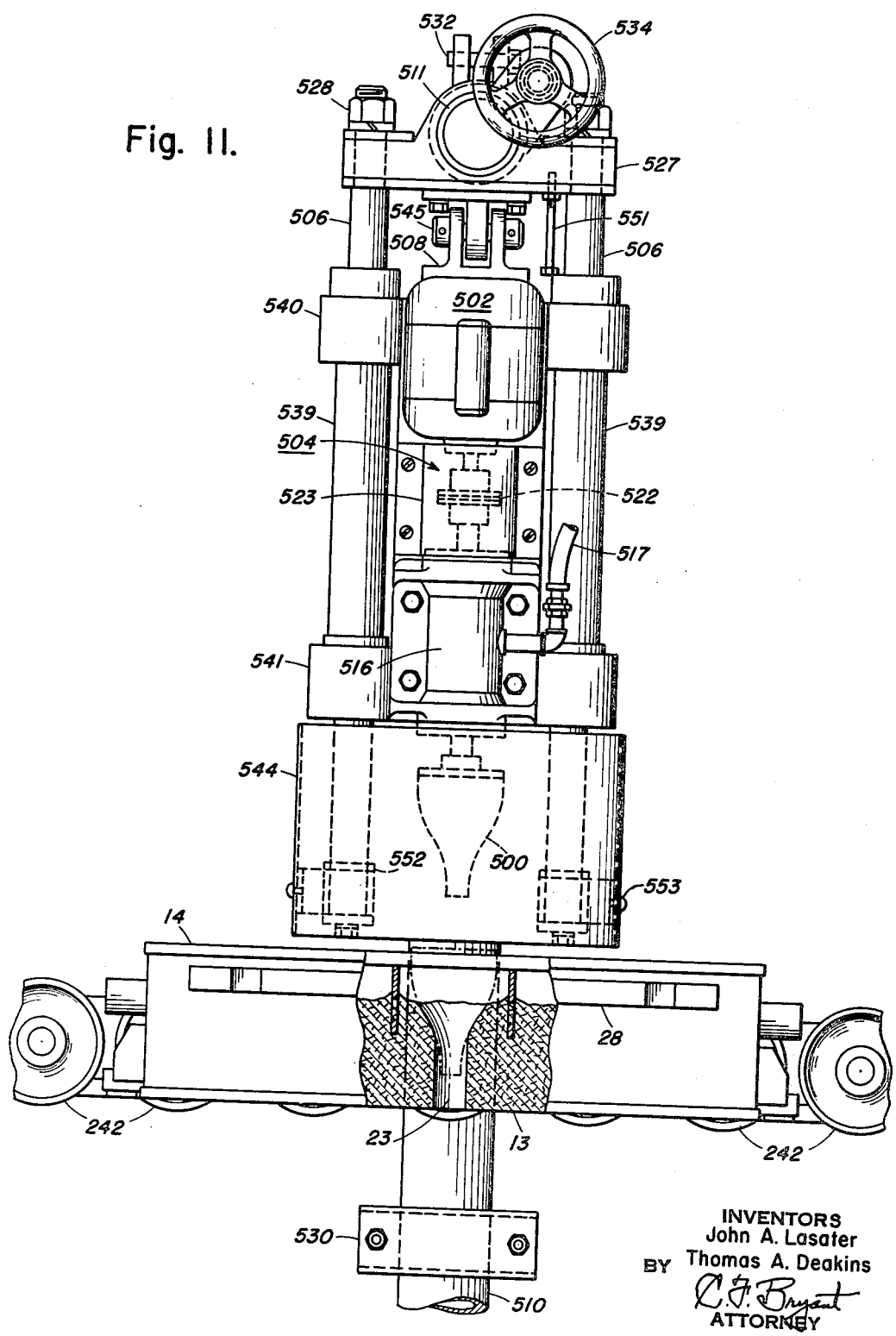

July 3, 1956  J. A. LASATER ET AL  2,752,646
SPRUE REAMING FACILITIES FOR MOLD ASSEMBLING INSTALLATION
Filed May 28, 1952  10 Sheets-Sheet 7

INVENTORS
John A. Lasater
BY Thomas A. Deakins
C. H. Bryant
ATTORNEY

July 3, 1956 J. A. LASATER ET AL 2,752,646
SPRUE REAMING FACILITIES FOR MOLD ASSEMBLING INSTALLATION
Filed May 23, 1952 10 Sheets-Sheet 8

INVENTORS
John A. Lasater
Thomas A. Deakins
BY
ATTORNEY

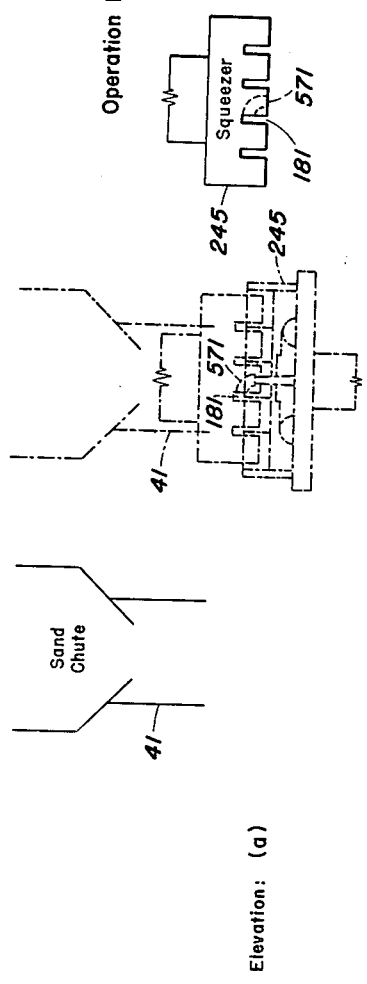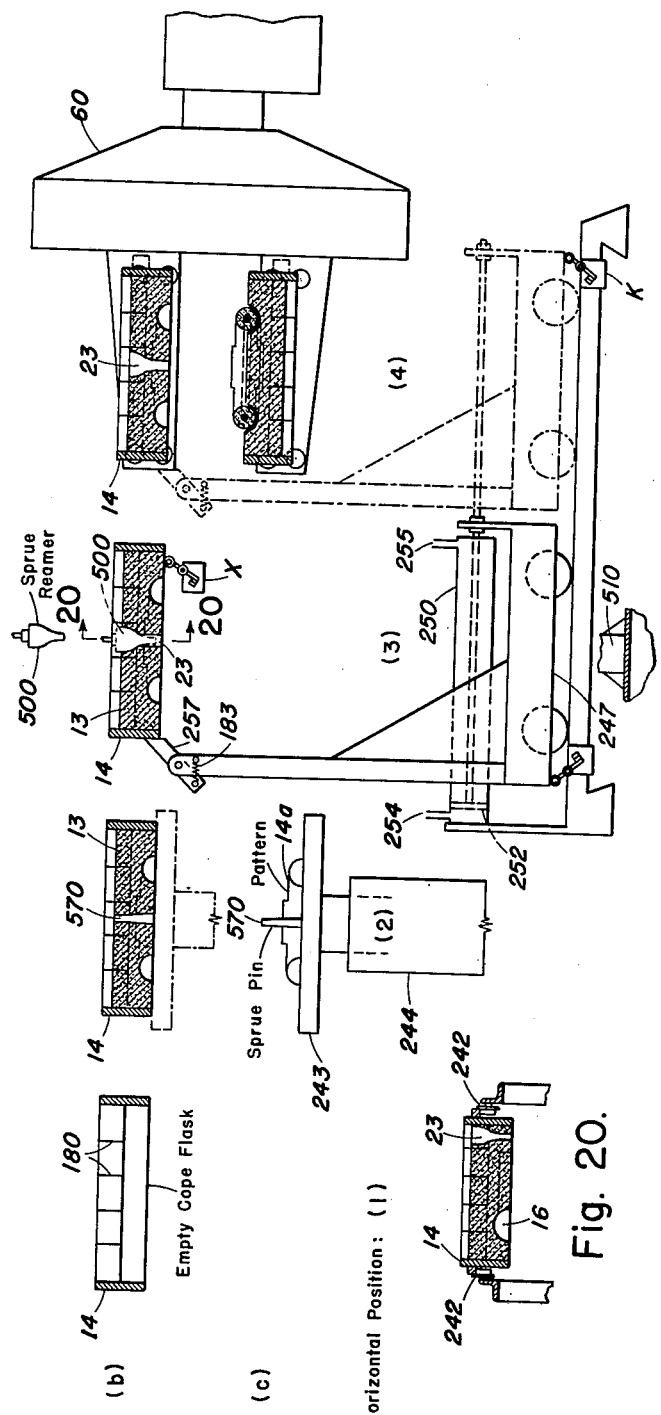

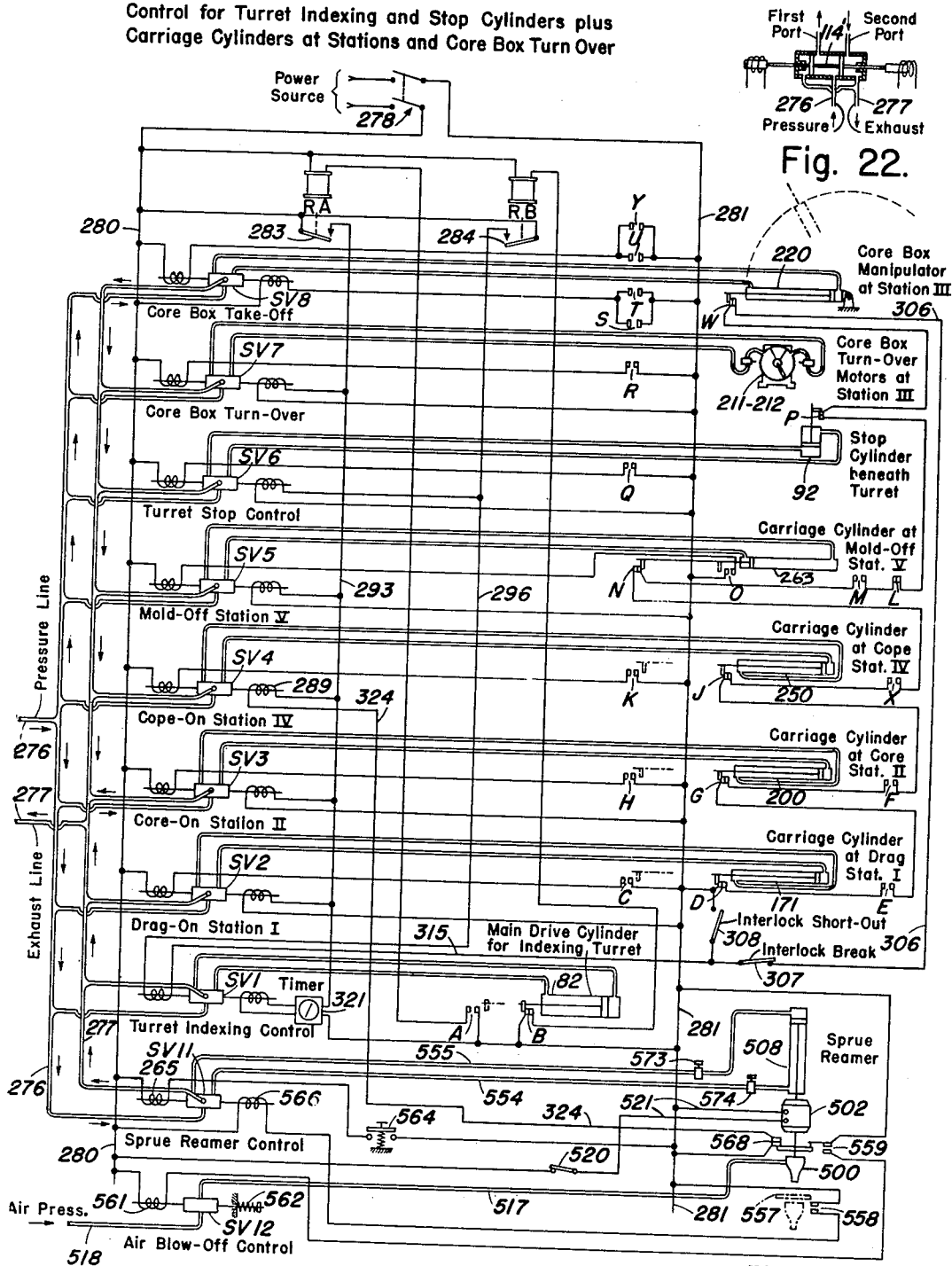

United States Patent Office 2,752,646
Patented July 3, 1956

2,752,646
SPRUE REAMING FACILITIES FOR MOLD ASSEMBLING INSTALLATION

John A. Lasater and Thomas A. Deakins, Chattanooga, Tenn., assignors to Combustion Engineering, Inc., a corporation of Delaware Application May 28, 1952, Serial No. 290,548

7 Claims. (Cl. 22—20)

This invention relates to the assembly of foundry molds by mechanized means such as are disclosed by copending application Serial No. 200,899 on "Apparatus and Technique for Assembling Foundry Molds," filed December 15, 1950, in the names of Samuel C. Northington, Jr., and John A. Lasater, now abondoned and replaced by continuation application Serial No. 511,941, filed May 31, 1955, on the same subject matter.

Broadly stated, the object of our invention is to better the performance of a complete mold assembling installation of the aforesaid mechanized type and also of the conventional non-mechanized type.

A more specific object is to provide such an installation with means for removing surplus sand from the sprue openings in the cope flasks that are to be assembled with cooperating drag flasks into complete molds ready for pouring.

Another object is to provide mechanism capable of reaming and cleaning the sprue opening of each cope flask which has been charged with sand preparatory to insertion into the mold assembling machine.

A further object is to provide means identified with the mechanized installation's Cope-On Station IV for accomplishing the aforesaid sprue reaming functions in a more or less automatic manner.

A still further object is to interlock our new sprue reaming facilities with the installation's cope inserting means in such manner that the reaming operation must be fully completed before the sand-charged cope flask can be inserted into the assembling machine.

Other objects and advantages will become apparent as the disclosure and description hereof proceeds.

One illustrative form of apparatus provided by us for practicing the invention is shown by the accompanying drawings wherein:

Figure 1 is a top plan view showing the sprue reaming facilities of our invention applied to Station IV of a mold assembling installation that is organized in accordance with Northington-Lasater application Serial No. 200,899 and that utilizes a central indexing machine surrounded by five cooperating stations which supply the machine with sand charged cope flasks and drag flasks plus green sand cores and which receive therefrom assembled molds ready for pouring.

Figure 2 represents a typical casting which may be produced in a mold that is assembled by the apparatus diagrammed in Fig. 1;

Figure 3 is an exploded view showing the components of a typical mold for casting two of the quarter-bend soil pipe fittings of Fig. 2;

Figure 4 shows how the drag, core and cope of Fig. 3 appear after they have been brought together to produce an assembled mold ready for pouring;

Figure 5 is a section in vertical elevation on line 5—5 through the assembled mold of Figure 4;

Figure 6 is a view from line 6—6 of Figure 4 showing the top of the drag and the interior of the core resting in the mold cavity thereof;

Figure 7 is a view in vertical elevation on line 7—7 through the assembled mold of Figure 4 showing further details of the sprue opening which extends downwardly through the sand that is packed in the cope flask;

Figure 8 is a view in side elevation taken along line 8—8 of Figure 1 showing how our new sprue reamer facilities at the installation's Station IV are supported over the run of cope-carrying track which leads from the cope charging apparatus into the central assembling machine;

Figure 9 is a view in front elevation taken along line 9—9 of Figs. 1 and 8 showing how the same sprue reaming mechanism appears when viewed from the front thereof;

Figure 10 is an enlargement of Fig. 8 showing the sprue reamer carriage in its uppermost position (in which the reamer is withdrawn from the sprue opening in the cope flask sand) and having certain portions broken away for illustration of details;

Figure 11 is a comparable enlargement of Fig. 9 wherein the sprue reamer carriage also occupies the uppermost position;

Figure 1:
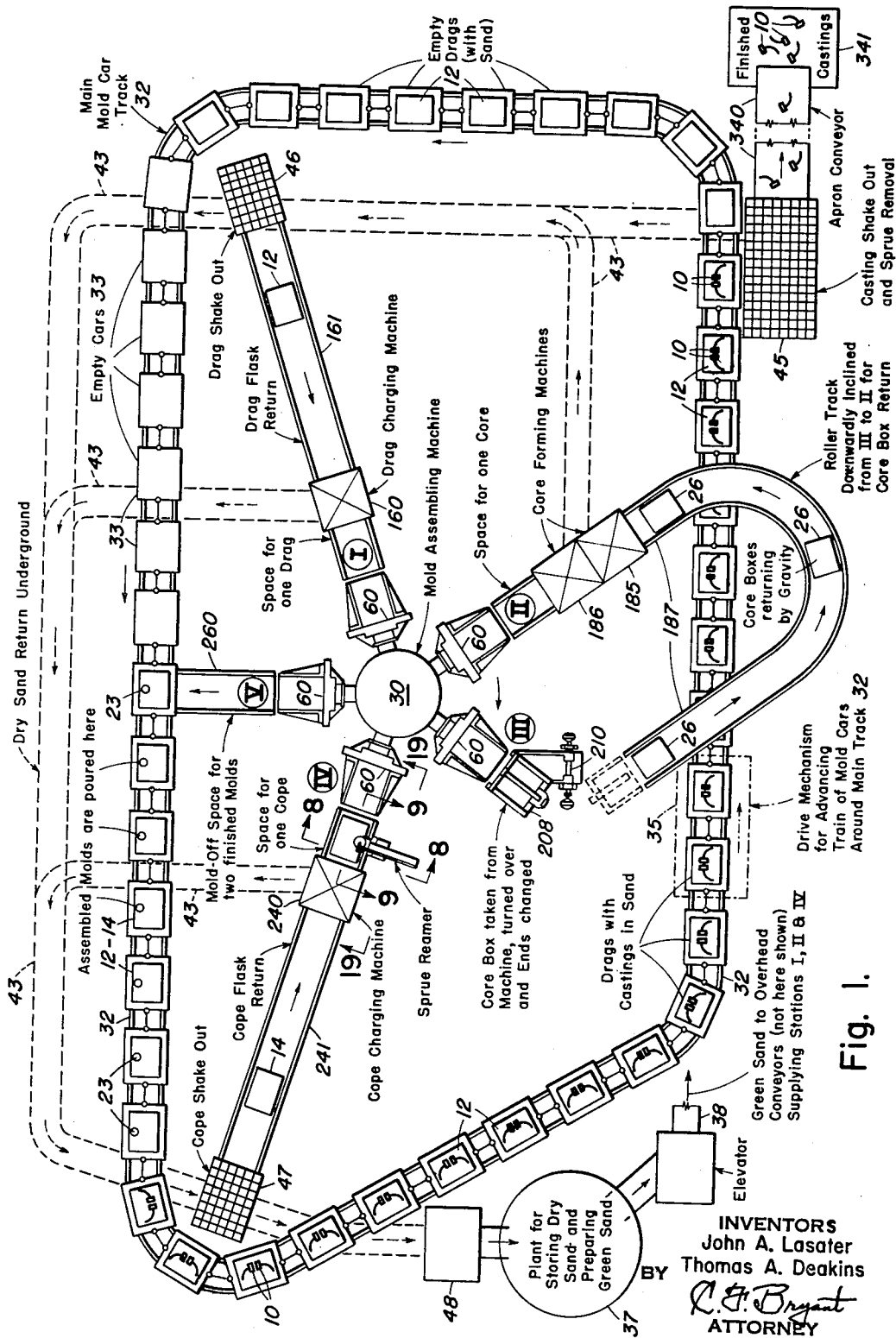
Figure 12:
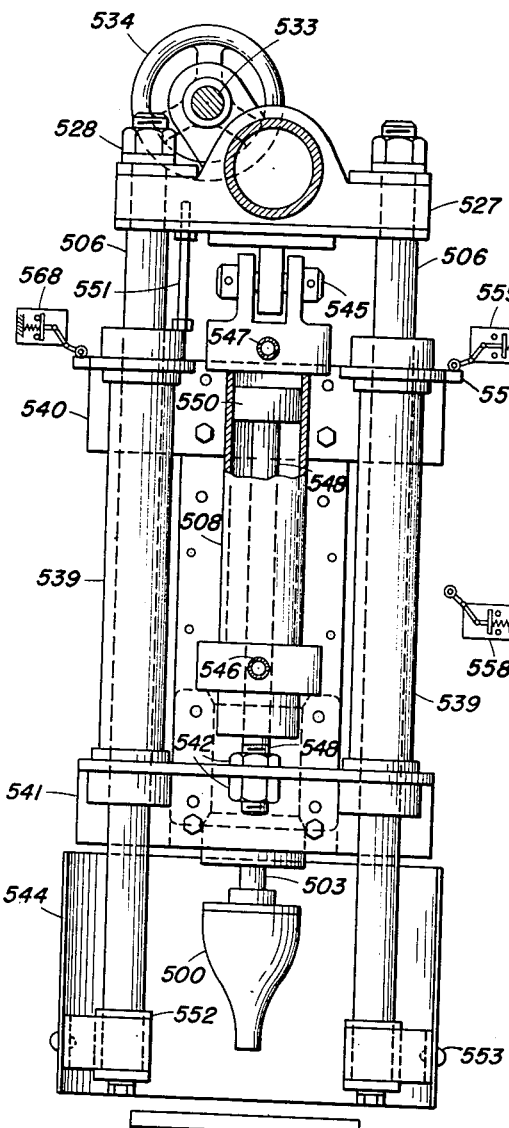
Figure 12 is a view in rear elevation taken on line 12—12 of Fig. 10 and showing how the hydraulic cylinder for moving the reamer carriage between its uppermost and lowermost positions is interposed between the two upright rods which serve to guide movement of the carriage through its range of up and down vertical travel.
Figure 13:
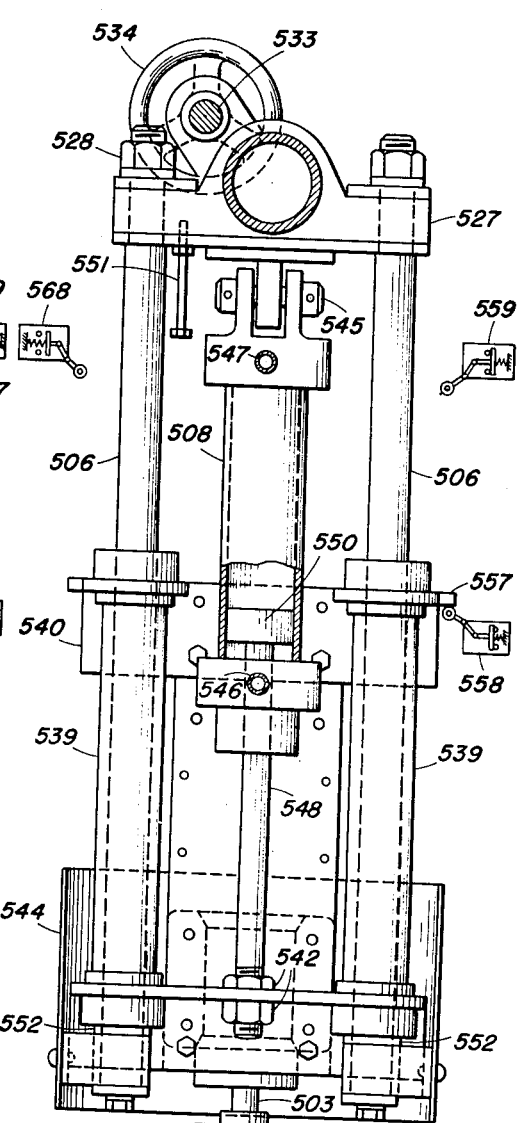
Figure 14:
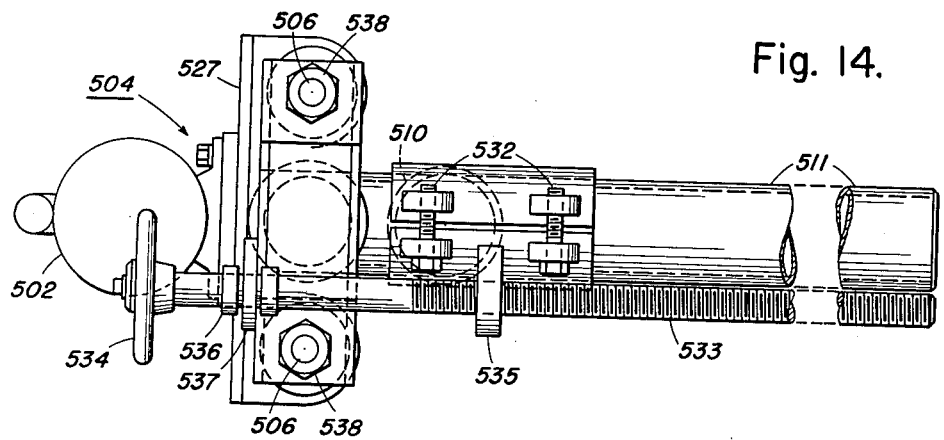
Figure 15:
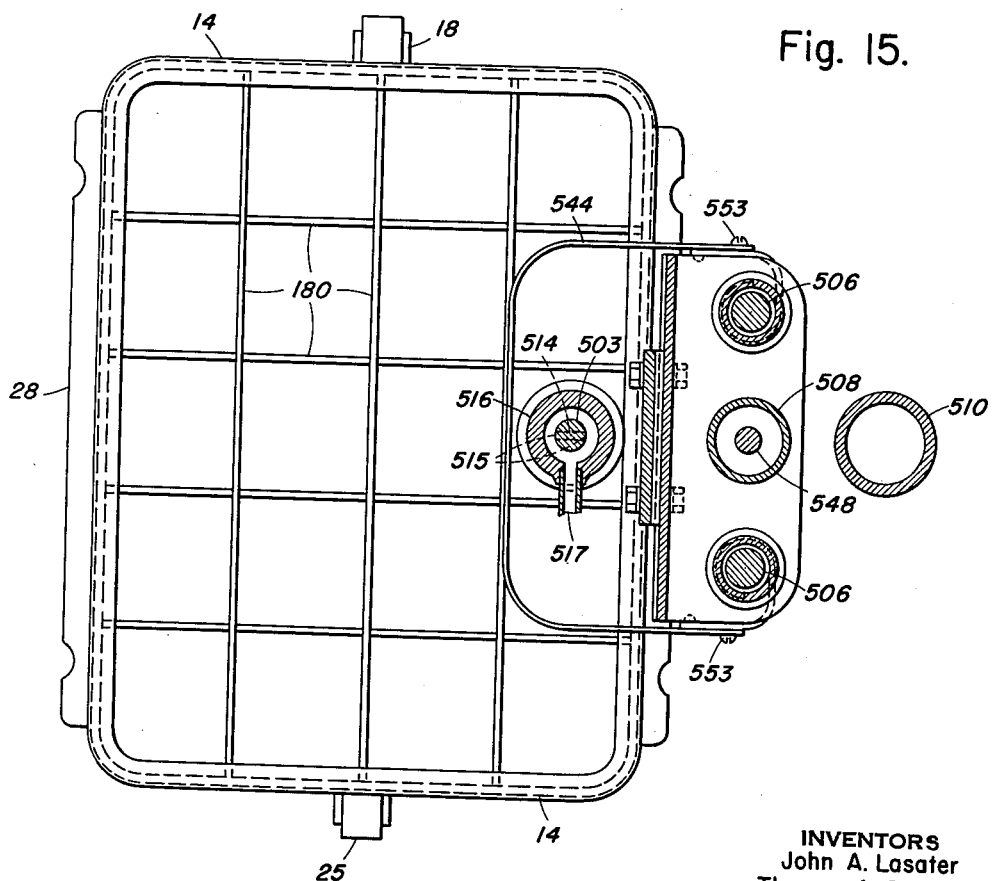
Figure 16:
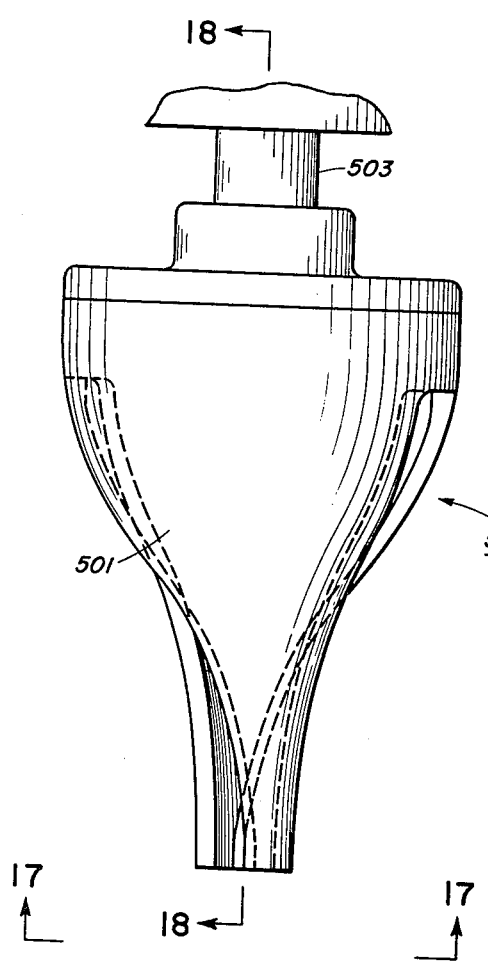
Figure 18:
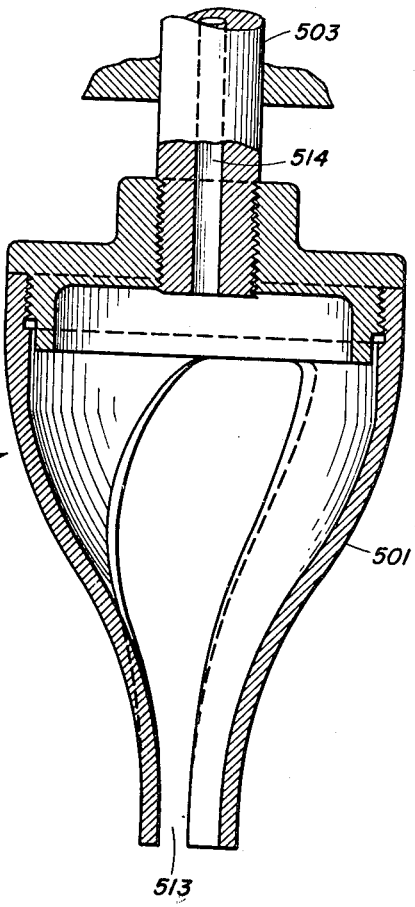
Figure 17:
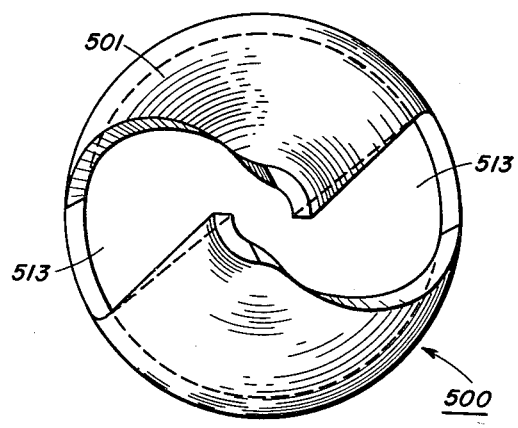

Figure 13 repeats the rear elevation showing of Fig. 12 and differs therefrom by illustrating the carriage in its lowermost position wherein the reamer engages with the sand (in the manner shown dotted by Fig. 10) that defines the sprue opening in the cope flask;

Figure 14 is a view on line 14—14 of Figs. 8 and 10 showing how the sprue reamer carriage appears when viewed from the top;

Figure 15 is a generally similar view on line 15—15 of Figs. 10 and 12 through the carriage guide rods and actuating cylinder plus the air chamber that communicates with the reamer interior;

Figure 16 is a side view of the rotatable reamer taken from line 16—16 of Figure 10;

Figure 17 is a bottom view of the same reamer taken from line 17—17 of Fig. 16 and showing the hollow construction thereof;

Figure 18 is a section on line 18—18 of Fig. 16 through the reamer and the drive shaft therefor and showing the central shaft passage through which air is supplied to the reamer interior;

Figure 19 is a simplified diagrammatic representation, taken from line 19—19 of Fig. 1, of the cope-charging and arm-loading apparatus at Station IV with which the new sprue reaming facilities of the present invention are used;

Figure 20 is a section on line 20—20 of Fig. 19 showing how the side bars of each cope flask ride on rollers in approaching the assembling machine arms at Station IV;

Figure 21 is a diagrammatic showing of the hydraulic and electrical control circuits utilized to operate our sprue reaming facilities at Station IV in coordinated relationship with the central assembling machine and its associated station apparatus comprising the complete installation shown by Fig. 1; and Fig. 22 shows typical internal construction for each of the solenoid valves utilized in the control system of Fig. 21.

The mold assembling and casting production practice to be benefited

The sprue reaming facilities of our invention are here illustratively shown as being applied to mold assembling and casting production apparatus organized as per the aforesaid copending Northington-Lasater application Serial 200,899, filed December 15, 1950, under title of "Apparatus and Technique for Assembling Foundry Molds."

That apparatus is suitable for the production of castings having a wide variety of sizes, characters (including solid as well as hollow formation) and shapes. Of these the quarter bend soil pipe elbow represented at 10 in Fig. 2 may be considered as typical. To produce castings such as 10 in static molds of conventional character requires preparation and assembly of the component parts for each mold which are represented in Fig. 3.

These include a lower flask half 12 referred to as the "drag"; an upper flask half 14 referred to as the "cope"; suitable "green" sand 13 or the like packed into both the drag and cope for receiving cavity impressions 16 from the casting pattern (shown in part by Fig. 19); and a core 15 ("green" sand or other) placed within the mold cavity to form the hollow interior of casting 10. In the illustration here made the aforesaid casting pattern and co-operating core 15 are both shaped to provide for simultaneously casting two of the quarter bend fittings 10 in each mold 12—14 when assembled as indicated in Fig. 4; and the represented "green" sand core 15 is shown as being provided with a reinforcing arbor indicated at 21 in Figs. 5 and 6.

From Figures 4–5–6 it will be seen that after mold assembly the core 15 rests in cavity 16 of the drag 12; that cope 14 has been lowered upon the drag where it is maintained in accurately aligned relationship by pins 17 upstanding from the drag ends over which are fitted mating brackets 18 attached to the cope ends; and that the two flask halves 12 and 14 are held together by opposing end clamps 19 that engage cooperating lugs 20 on the drag and cope frames.

When so assembled there is provided within the mold interior an open cavity space shown at 22 in Figs. 5–6 into which space there flows molten metal when poured from a ladle (not shown) into the sprue opening 23 (see Figs. 3–4) in the cope sand; said poured metal flowing downwardly through opening 23 and then horizontally through passage 24 (see Figs. 3, 6 and 7) in the drag sand and thence into the aforesaid mold cavity 22 communicating with that passage.

In the aforesaid copending Northington-Lasater application Serial No. 200,899 it is pointed out that preparation of the mold components shown by Fig. 3 involves not only packing sand 13 or the like into the drag flask 12 and cope flask 14 but also accompanying manipulations of a core box required to form the core 15 of Fig. 3 and place it in the cavity 16 of drag 12; that the drag flask 12 and the scope flask 14 each must face down over its pattern half when charged with sand 13 or the like, yet in the finally assembled mold the drag 12 is required to face up as Figs. 4–5–6–7 show; that the lower core box half (designated as 26 in Fig. 1) must face up while the core 15 is being formed therein, yet roll over thereof along with the drag 12 is necessary incident to transferring the core 15 from the box half; that the sand-charged cope 14 must thereafter be brought together with this core-carrying drag 12 and secured thereto in order to provide a finished mold (Fig. 4) that is ready for pouring; and that the aforesaid mold components are typically heavy (the assembled mold of Fig. 4 weighing nearly 400 pounds) and cumbersome (said Fig. 4 mold having inside dimensions of 26 inches by 20 inches and being 14 inches tall) and therefore difficult to handle.

*Illustrative mold assembling facilities improveable by our invention*

In accordance with said Northington-Lasater application Serial No. 200,899 the preparation, manipulation and assembly operations are accomplished mechanically and more or less automatically; mold assembly speed thereby being increased and various other benefits being made available. In Fig. 1 hereof illustrative apparatus for accomplishing such mechanized assembly of the molds is diagrammatically represented as utilizing a central indexing machine 30.

Said central mold assembling machine 30 is equipped with a turret rotatable about a vertical axis and provided with five arm heads 60 spaced circumferentially (72° apart) around the turret. Each of these five arm heads 60 is mounted for roll over about a horizontal axis radial to the turret center; and carried by each head are upper and lower flask receiving arms that extend outwardly from the head in radial relation to the turret, the upper and lower arms in each of these head sets being adapted for movement towards and away from each other.

Provision is made for successively advancing machine 30's central turret through the angular distance (72°) between arm heads 60 whereby each set of upper and lower arms progressively occupies at-rest positions spaced around the turret periphery's rotative path at the station locations designated I–II–III–IV–V in Fig. 1.

At the first or "Drag-On" Station I of Fig. 1 use is made of drag charging machine 160 and cooperating facilities for inserting into the upper arm of each head 60 there coming to rest a sand charged drag flask 12 (Fig. 3) having its pattern impression 16 facing down.

At the second or "Core-On" Station II of Fig. 1 there are provided core forming machines 185—186 and co-operating facilities for inserting into the lower arm of each head 60 there coming to rest a core box half 26 having a finished core 15 therein facing up from the box half.

Following Station II is a third or "Core-Box-Off" Station shown at III in Fig. 1; and cooperating with the turret of central machine 30 are control means responsive to advancement by the turret of each arm head 60 from Station II to Station III for first moving the upper and lower arms on that head together thus bringing the core 15 into the drag 12's patter cavity 16 (Fig. 3) and then rolling said arms through 180° about the head axis thus placing the drag 12 on the bottom and the core 15 on top thereof with the core box half 26 above the core and then moving the two arms away from each other thus lifting the core box half 26 free both of the drag 12 and the core 15 now resting in the drag's pattern cavity.

At the aforesaid "Core-Box-Off" Station III is mechanism 208—210 plus cooperating facilities for withdrawing the empty and now inverted core box half 26 out of the upper arm of each turret head 60 there coming to rest, for turning that box half over and interchanging its two ends, and for returning it to "Core-On" Station II via the gravity track 187 of Fig. 1.

At the fourth or "Cope-On" Station IV of Fig. 1 use is made of cope charging machine 240 and cooperating facilities for inserting into the upper arm of each head 60 there coming to rest a sand charged cope flask 14 (Fig. 3) having its pattern impression facing down.

Following Station IV is a fifth or "Mold-Off" Station shown at V in Fig. 1; and cooperating with the turret of central machine 30 are control means responsive to advancement by the turret of each arm head 60 from Station IV to Station V for moving the upper and lower arms of that head together thus bringing the cope 14 together with the drag 12 with the cope's pattern cavity fitting over the core 15 now supported by the drag.

At the aforesaid "Mold-Off" Station V is a conveyor track 260 plus cooperating facilities for withdrawing from the two closed arms of each turret head 60 there coming to rest the now assembled mold made up of the drag 12, core 15 and cope 14 brought together as just described.

And cooperating with central machine 30's turret are further control means responsive to advancement by the turret of each arm head 60 from Station V to the first named "Drag-On" Station I for moving the upper and lower arms on that head away from each other preparatory to repeating the mold assembly cycle outlined above.

Adaption of the drag flask 12, the cope flask 14 and the core box half 26 for the aforesaid handling by this central mold assembling machine 30 is effected by providing each of these mold parts with the sidebars represented at 28 in Figs. 3, 4, 6 and 7; attachment of these side bars 28 to the metal side walls of each drag, cope and core box being effected by welding or in other suitable manner as said copending Northington-Lasater application more fully describes.

In the installation reproduced by Fig. 1 hereof from the aforesaid Northington-Lasater application Serial No. 200,899 the central indexing machine 30 is surrounded by the five cooperating Station I–II–III–IV–V above described and the various devices at those five stations are in turn surrounded by a main track 32 arranged in continuous loop or closed circuit and carrying a relatively large number of mold cars 33 coupled together into a continuous string or unbroken train; the original track layout of said copending application bending directly around cope shakeout 47 as here represented.

All of the mold cars 33 in the named train are slowly advanced around track 32 in counterclockwise direction, as indicated by the arrows of Fig. 1; such advancement being effected by drive mechanism 35. In the illustrative organization here shown, each car 33 comprises a flat top or platform somewhat larger than the drags 12 and assembled molds 12—14 to be carried thereon; each of these platforms is supported by four wheels that ride on the parallel rails of track 32 in conventional manner; and the drive mechanism 35 is positioned beneath track 32 and provided with means for engaging successive cars 33 and thereby pushing the entire train around the track at a speed selectable from about nine to twenty four feet per minute, with a car speed of about fourteen feet per minute being typical.

Sand (designated at 13 in Figs. 3–4–5–6–7) of so called "green" grade or other suitable material for charging the drags 12 and copes 14 and forming the cores 15 is supplied to Stations I, II and IV of the Fig. 1 installation from a sand plant 37 via a system of overhead conveyors (not here shown). Those conveyors carry the "green" sand prepared in plant 37 from elevator outlet 38 to receiving hoppers (not shown) provided at the aforesaid three stations as more fully disclosed by Northington-Lasater application Serial No. 200,899.

Spillage sand from said Stations I, II and IV is conveyed back to plant 37 by a system of underground return conveyors 43. These conveyors pick up sand not only from Stations I, II and IV but also from a casting shakeout 45, a drag shakeout 46 and a cope shakeout 47; they return the so picked up sand to an elevator 48 which carries it from the underground level to the top of an elevated storage bin from which the sand is released as needed into mixing, moistening and other apparatus used to prepare it for redistribution to Stations I, II and IV via overhead conveyors 38.

*The improvements added by present invention*

The improvements of our invention as depicted by the drawings hereof better the performance of the complete mold assembling installation just described by reaming and cleaning surplus sand from the sprue opening 23 of each cope flask 14 which has been charged with sand by machine 240 at Station IV preparatory to insertion into the mold assembling machine 30.

These improvements reside in mechanism here illustratively shown at Station IV as including a sprue reamer 500, a motor 502 which rotates the reamer via a vertical shaft 503, a carriage 504 mounting the motor and reamer and being movable along vertical guide rods 506 between an upper and a lower position, a hydraulic cylinder 508 for selectively actuating the carriage between said two positions, and means including an upright column 510 plus a horizontal member 511 mounted on the top thereof for supporting the reamer carriage 504 and associated elements in the represented position over the sprue opening 23 in each cope flask 14 conveyed along track rollers 242 from the charging machine 240 to the central assembling machine 30.

Said sprue reamer 500 has a size and shaping which coordinates with the cope flask sprue openings 23 to be acted upon; the particular sprue reamer which is here illustratively shown (most clearly by Figs. 16–17–18) at 500 thus tapers from a small diameter at its bottom to a substantially large diameter at its top; and it may satisfactorily be formed of a hollow cone-shaped shell 501 whose wall is provided with opposed slot-like openings 513 therethrough and the bottom of which is open.

The reamer's hollow interior preferably is adapted to receive compressed air or other blow off fluid through a central opening 514 (Fig. 18) in the mounting shaft 503. In the illustrative apparatus shown, said shaft opening 514 communicates via lateral openings 515 (see Figs. 10 and 15) with an air chamber 516 that under the control of a valve shown at SV12 in Fig. 21 has blow off air admitted thereinto (via flexible conduit 517) from any suitable source designated 518 in Fig. 21. The utility of such blow off provision will become more apparent presently; but it may here be mentioned that conduit 517 is made flexible in order to accommodate up and down movements on the part of the carriage assemblage 504.

The motor 502 for spinning the sprue reamer 500 may be of comparatively low capacity (fractional horsepower or higher as needed) suitable for energization from the control potential appearing between the two vertically drawn supply conductors designated 280 and 281 in Fig. 21. In the system here shown said potential is applied to conductors 280—281 via a switch 278 from any suitable power source, such as a commercial 110 volt lighting circuit of either the alternating current or the direct current type; motor 502 receives driving current from said conductors over a local control switch 520; and use is made of flexible supply leads 521 (see Figs. 8 and 21) to accommodate movements by the motor up and down with the sprue reamer carriage 504.

When energized in the manner aforesaid motor 502 rotates the sprue reamer 500 at some relatively high rate of speed such as about 1750 R. P. M. In the arrangement illustrated such rotation is imparted to the reamer via a coupling 522 housed within a shield 523 and secured to the upper end of reamer shaft 503 in the manner shown; said shaft is carried by a lower bearing 524 and by a corresponding upper bearing (not shown) that respectively define the lower and upper ends of the aforesaid chamber 516; and it is from said chamber that pressurized blow off air enters the lateral openings 515 in shaft 503 for flow downwardly through the central shaft passage 514 into the hollow interior of sprue reamer 500.

As earlier indicated, said motor and reamer and interconnecting drive means are included in the aforesaid carriage 504 which is movable up and down along guide rods 506 under the action of hydraulic cylinder 508. Said left and right guide rods 506 are secured at their tops to a support bracket 527 via nuts 528; said support bracket surrounds and is fixed to one end of the aforesaid horizontal mounting member 511 which passes through the horizontal portion of a T fitting 528 fixed via an integral vertical portion to the top end of upright mounting column 510; and said upright column is secured at its base to a floor member 529 and derives steadying support through a connection 530 with a structure member 531 (see Figs. 8–9) forming support means for side rollers 242 along which the sand-charged cope flasks 14 ride in approaching the assembling machine 30 at Station IV.

In this way the weight of the entire sprue reaming assemblage is carried by said upright column 510 which constitutes a relatively rigid support therefor, and the rotatable reamer 500 is thereby positioned above and over the cope flasks 14 which pass from sand charging machine 240 into the central assembly machine.

The represented apparatus includes provision for adjusting the spacing of the carriage 504 from support column 510 in order accurately to align the sprue reamer 500 with the sprue opening 23 in each cope flask 14 passing therebeneath. To effect such adjustment the clamp bolts 532 along the top of T fitting 528 are first loosened thereby freeing horizontal member 511 for lateral movement through that fitting; threaded shaft 533 is via handwheel 534 turned in mating protrusion 535 (fixed to fitting 528) thereby advancing the rod through or withdrawing it from said fitting protrusion and via collars 536 on either side of member 537 (secured to carriage support bracket 527) causing the entire carriage 504 and reamer 500 to move closer to or further away from the fixed support column 510.

Once sprue reamer 500 has in this way been accurately aligned with the sprue openings 23 in the cope flasks 14 passing along track rollers 242 therebeneath, the clamp bolts 532 are again tightened. Such tightening rigidly secures the horizontal support member 511 in the T fitting 528 on the top of vertical support column 510 and conditions the sprue reamer assemblage for its intended operation.

Further utilized by the represented apparatus is a lower shield 544 secured to the bottom ends of left and right guide rods 506 via fastenings 553. This shield surrounds the sprue reamer 500 in the manner shown and its purpose is to confine sand flying outwardly from the reamer when spinning from being thrown outwardly away from the reamer in a manner which might be objectionable were the shield not used.

The movable carriage and actuating cylinder

It already has been pointed out that the sprue reamer carriage 504 is movable up and down along the left and right guide rods 506, and that said movement is effected by the hydraulic cylinder 508. In the illustrative form here shown said carriage utilizes left and right side guides 539 rigidly joined with the carriage structure via top and bottom guide plates 540 and 541; those side guides 539 respectively extend in sliding engagement around the aforesaid left and right guide rods 506 (that in turn project downwardly from the top support bracket 527 into which the rod tops are secured); and for assuring proper lubrication between the sliding surfaces there is provided within each side guide 539 a space shown at 542 in Fig. 10 into which lubricant may be packed.

Up and down movement on the part of this reamer carriage 504 is produced by the aforesaid hydraulic cylinder 508 (most clearly shown by Figs. 12–13). In the arrangement shown this cylinder 508 has its shell or body attached to said top support bracket 527 via a connection 545 while the piston rod 548 of the cylinder is secured via clamp nuts 542 to the bottom guide plate 541 of the sprue reamer carriage. Admission of pressure fluid into port 546 of this cylinder causes piston 550 to move the carriage upwardly toward the top position shown by Figs. 8, 9, 10, 11, 12; said upward movement being arrested when the carriage contacts a stop member 551 as shown in Figs. 10 and 12.

Similarly, admission of pressure fluid into port 547 causes downward movement by the carriage towards the bottom position shown in Fig. 13; said downward movement being arrested when the carriage contacts stop members 552 as shown in Fig. 13. The limit of this downward travel by the carriage is adjusted so that the spinning reamer 500 will advance to a proper selected depth in the sprue opening 23 of the cope flask 14 therebeneath.

The mentioned pressure fluid for operating sprue reamer cylinder 508 is supplied thereto via flexible conduits shown at 554 and 555 in Fig. 21 under the control of a solenoid valve SV11 and from suitable facilities diagrammed in Fig. 21 as including a fluid pressure line 276 and a fluid exhaust line 277. Said solenoid valve SV11 may have the internal construction diagrammed by Fig. 22. The valve stem there designated 114' is by energization of the solenoid shown at the left of the diagram withdrawn to the left as represented where it remains even after the left solenoid is deenergized; but upon energization of the right solenoid (with the left winding deenergized) the stem 114' is drawn to the right where it remains until the left winding is again energized (with the right winding deenergized).

With the stem at the left (Fig. 22) pressure fluid from line 276 flows as indicated by the small arrows out of the valve casing through the "first" port at the top left thereof for flow through conduct 555 (Fig. 21) to enter port 547 of cylinder 508 and thereby move piston 550 downwardly; the "second" port at the top right of Fig. 22 now being in communication with exhaust line 277. When, however, the valve stem 114' is shifted to the right, pressure fluid from line 276 flows out of the valve casing through the top right or "second" port to pass through conduit 554 and enter port 546 of cylinder 508 and thereby move piston 550 upwardly; the top left or "first" port now being placed in communication with exhaust line 277.

In this way up and down movements of the sprue reamer carriage 504 are produced and controlled. The earlier mentioned flexibility on the part of fluid conduits 554—555 leading from solenoid valve SV11 to cylinder 508 is provided in order to accommodate the aforesaid up and down movements by said sprue reamer carriage.

Switches for governing carriage travel, etc.

When carriage 504 reaches its extreme downward position of Fig. 13, portion 557 thereof has the position shown dotted in Fig. 21 and effects closure of a normally open limit switch shown at 558 in Figs. 12, 13 and 21. Through the control circuits of Fig. 21 the so closed switch acts upon solenoid valve SV11 in a way causing cylinder 508 to initiate upward movement of the sprue reamer carriage. Once initiated this upward movement (produced by hydraulic cylinder 508) continues until the carriage 504 has been fully returned to the uppermost position of Figs. 8–9–10–11–12.

Upon arrival of the carriage in said uppermost position portion 557 engages a second limit switch shown at 559 in Figs. 12, 13 and 21. This second limit switch is of the normally closed type and said engagement opens the switch contacts 559 to break the energizing circuit for winding 561 of the solenoid valve SV12 earlier mentioned as governing the supply of blow off air to the sprue reamer 500. Said valve SV12 is normally held closed by a spring 562; but when winding 561 becomes energized over limit switch contacts 559 (during the downward travel of the sprue reamer carriage 504) the valve opens to admit air from source 518 (Fig. 21) through flexible conduit 517 into the whirling reamer 500.

In the arrangement shown, said admission of blow off air thus continues from the time that the carriage 504 first moves downwardly out of its top position (when limit switch 559 closes) until the carriage again returns to the top position (when switch contacts 559 are reopened).

Such downward movement on the part of the carriage is initiated by a push button shown at 564 in Fig. 21 and located for convenient manual actuation by the operator at the installation's Station IV (Fig. 1). Normally this push button is open, and the sprue reamer carriage 504 then occupies the uppermost position which Figs. 8–9–10–11–12 show. Closure of button 564 serves to connect left winding 265 of solenoid valve SV11 across energizing conductors 280—281 thereby causing admission of pressure fluid into the top port 547 of cylinder 508 with attendant downward movement of piston 550 and the sprue reamer carriage 504.

Once so initiated by the push button said movement will continue till the carriage arrives at its extreme downward position. The speed of such downward advance by the carriage is adjustable via change in the setting of a throttling valve 573 placed in fluid conduit 555 as shown by Fig. 21; a relatively slow speed of downward lowering of the spinning reamer 500 into the sprue opening 23 of each cope flask 14 therebeneath proving most satisfactory in actual practice. Once however that lowermost position is reached, limit switch 558 closes to connect right winding 566 of solenoid valve SV11 across energizing conductors 280—281 thereby causing admission of pressure fluid into the bottom port 546 of cylinder 508 with attendant upward movement of piston 550 and the sprue reamer carriage 504. A faster speed of upward carriage travel is permitted, and this can be adjusted via change in the setting of a throttling valve 574 placed in fluid conduit 554 (Fig. 21); the first valve 573 in conduit 555 being arranged not to throttle reverse flow of fluid therethrough.

Return of the carriage to its top position (Figs. 8, 9, 10, 11, 12) not only stops (via limit switch 559) the flow of blow off air to the reamer, but via an interlock switch shown at 568 in Figs. 12, 13 and 21 it also conditions the carriage cylinder 250 (see Figs. 19 and 21) at Station IV for advancement of the sprue-reamed cope 14 from beneath the reamer mechanism into the central assembling machine 30 (see Figs. 1 and 19). Said interlock switch 568 is of the normally open type and the contacts thereof are serially included in the circuit 324 over which the right winding 289 of solenoid valve SV4 (see Fig. 21) is at proper times (and by a relay RA) supplied with energizing current.

With this arrangement downward movement of the sprue reamer carriage 504 out of its topmost position opens interlock switch 568 and by breaking the aforesaid circuit 324 for SV4 winding 289 prevents the carriage cylinder 250 at Station IV from moving the sand-charged cope 14 into the assembling machine 30 until after the reamer carriage 504 has again been fully returned to its topmost position. This safeguard has the practical significance later to be made evident.

*Initial formation of sprue openings 23 at Station IV*

The inventively new sprue reamer facilities which have just been described coordinate with the installation's Station IV cope charging and manipulating facilities which Figs. 1 and 19 hereof reproduce from the aforesaid copending Northington-Lasater application Serial 200,899; the present disclosure further showing a sprue pin 570 that projects up from the platen 243 by which the cope pattern 14a is carried.

Cope flasks 14 lifted from the assembled molds 12—14 approaching shake out 47 along track 32 (after having been poured opposite Station V) first have the sand removed therefrom by device 47 and thence pass along track 241 (with open portions facing down) at elevation b in Fig. 19 towards the cope charging machine shown at 240 in Fig. 1. The operator at Station IV then pushes each empty flask 14 to position 1 of Fig. 19 next to charging machine 240 and then into position 2 over the platen 243 and pattern 14a initially at lower elevation c.

Said platen 243, pattern 14a and sprue pin 570 are now moved by cylinder 244 upwardly beneath flask 14 in position b2 into contact with the lower face of the flask rim. The sand chute 41 is next moved to the dotted position over the empty flask 14 at b2 and there is released therefrom a measured quantity of sand which falls into the flask 14 as generally indicated at 13; the sand being loose and uncompacted at this point. The chute 41 is thereupon returned to the solid line position of Fig. 19 leaving the sand filled cope 14 on platen 243 exposed at its top.

The squeezer head 245 is next moved from position 3 to position 2 over the sand filled flask 14 at b2, and the platen 243 is by cylinder 244 moved farther upwardly to elevation a bringing the loose sand in flask 14 against the lower face of squeezer head 245. Said head is now mechanically vibrated in well known manner for the purpose of compacting the sand firmly around the pattern 14a against the sides of flask 14 and between the perforated cross members 180. The squeezer head has the customary slots 181 into which the flask cross members 180 fit, thereby allowing intervening portions of the head to rest directly upon and firmly compact the sand 13 in flask 14.

Due to the presence of sprue pin 570 (Fig. 19) the aforesaid filling of the cope flask 14 with sand and the compacting of same therein is accompanied by the formation of the sprue opening shown at 23 by Fig. 19 and various other views; and to facilitate such formation the squeezer head 245 is provided with a relief passage 571 through which sand pushed ahead of pin 570 during the compacting operation can escape into one of the slots 181. It is on the sprue opening 23 so initially formed that the reaming apparatus of the present invention acts in a manner more fully to be described presently.

Following this compacting operation the cope flask 14 filled with sand above and around pattern 14a and around sprue pin 570 is lowered by platen 243 from elevation a to elevation b where the side bars of the flask rest upon track rollers 242 as shown in Figs. 8, 10, 11 and 20. The platen 243 and pattern 14a are then further lowered by cylinder 244 to elevation c leaving in the exposed bottom face of the flask sand 13 a pattern impression corresponding to that represented at 16 in Fig. 3. While this is going on the squeezer head 245 is shifted from the dotted position of Fig. 19 to the full line position.

From the location b2 the sand filled cope flask is advanced by the Station IV operator along track rollers 242 to horizontal position 3 directly over the carriage 247. During such advancement the latch 257 at the carriage rear is pushed downwardly and forwardly until the rear edge of flask 14 has cleared same, when spring 183 returns the latch to the full line position shown behind the flask. At the same time the forward end of the flask engages interlock switch X and effects closure of its contacts for a purpose later to be explained.

It is in this position 3 (carriage 247 fully to the rear and flask 14 abutting latch 257) of Fig. 19 that each sand charged cope flask 14 is ready to be acted on by the sprue reamer 500 of the present invention; for in said position the cope sprue opening 23 is directly beneath the reamer 500 as represented. Such action by our new sprue reamer apparatus is discussed more fully at a later point herein.

Following the reaming operation on sprue opening 23, the cope 14 charged with sand (which carries the impression of pattern 14a) as aforesaid is ready for advancement into the upper arm of the head 60 which is in register with Station IV, as represented by Figs. 1 and 19. Such advancement is accomplished by admitting into port 254 of cylinder 250 pressure fluid that forces piston 252 forward moving with it carriage 247 which pushes (via latch 257) the sand filled cope 14 into the arm-engaged position 4 represented at the right of Fig. 19.

Following such advancement of a sand charged cope 14 from position b3 to position b4 of Fig. 19, the carriage 247 is automatically returned by cylinder 250 to position b3. This return is accomplished by admitting into port 255 of that cylinder pressure fluid which moves piston 252 to the left; the facilities utilized for accomplishing such admission being controlled by limit switch K as diagrammed in Fig. 21.

The Station IV apparatus of Fig. 19 is now in condition for moving another empty core flask 14 to the right from location b1 of Fig. 19, charging it at locations b2 and a2 with sand which receives the impression of pattern 14a and has sprue opening 23 initially formed therein by pin 570, moving the cope on to location b3 where said opening 23 is reamed by device 500 in accordance with the present invention, and from location b3 then moving the cope (via carriage 247) into position b4 in the upper arms of the next head 60 which machine 30 brings into register with Station IV.

*Other apparatus comprised by control system of Fig. 21*

Fig. 21 hereof constitutes a reproduction of Fig. 59 of the aforesaid copending Northington-Lasater application Serial No. 200,899, filed December 15, 1950, on "Apparatus and Technique for Assembling Foundry Molds" and adds thereto (at the bottom thereof) the sprue reamer control facilities that are involved by the present invention.

Fig. 21 hereof thus repeats from the earlier case Fig. 59 the eight solenoid valves SV1, SV2, SV3, SV4, SV5, SV6, SV7 and SV8 plus the main drive cylinder 82 for indexing the central assembling machine 30 plus the drag carriage cylinder 171 at Station I plus the core carriage cylinder 200 at Station II plus the core box manipulator 220 and turn over motors 211—212 at Station III plus the cope carriage cylinder 250 at Station IV plus the mold off carriage 263 at Station V plus the turret stop cylinder 92 for the central machine plus limit and interlock switches A, B, C, D, E, F, G, H, J, K, L, M, N, O, P, Q, R, S, T, U, W, X, Y, plus the timer 321 for turret indexing control plus system relays RA and RB plus the switch 278 through which control potential is impressed between conductors 280 and 281 plus conductors 293 and 296 associated with relay contacts 283 and 284 plus interlock conductors 306 and 315 together with interlock break and interlock short out switches 307 and 308 plus the earlier mentioned fluid pressure and exhaust lines 276 and 277.

*Operation of sprue reaming facilities here disclosed*

How the complete mold assembling system incorporating our improvements operates will have become more or less apparent from the foregoing description of the various component devices and parts which make up that system. It is first of all to be observed that the fundamental functions of mold assembly and casting production are little changed from those performed by the facilities of Fig. 1 as disclosed by copending Northington-Lasater application Serial No. 200,899 earlier referred to.

But by reason of the sprue reaming improvements of the present invention certain limitations have been removed from said earlier system operation and certain advantages have been secured therefor.

The limitations mentioned arise from the fact that the sprue openings 23 initially formed in the cope flasks 14 by sprue pin 570 (Fig. 19) tend to be irregular in contour and to carry inside thereof excess sand which upon pouring of each assembled mold 12—14 passes with the molten metal into the mold interior with accompanying impairment in the perfection of the finished casting (such as 10 of Fig. 2). The sprue reaming facilities here shown overcome this limitation by reaming and cleaning the sprue opening 23 of each cope flask 14 which has been charged with sand preparatory to insertion at Station IV into the mold assembling machine 30.

The resulting advantage is a higher percentage of perfect castings 10 producible in molds assembled by this mechanized technique.

As pointed out hereinbefore the central molding machine of Figure 1 requires that a prepared cope be inserted therein every fifteen seconds. This means that once every fifteen seconds the reamer apparatus is caused to go through the cycle of sprue reaming operations which will now be described.

This cycle is started when the cope operator at Station IV depresses push button 564 (Fig. 21). Such depression of the button is in each case preceded by advancement of a sand charged cope 14 into position b3 of Fig. 19 wherein the rear of the flask abuts latch 257 and the initially formed sprue opening 23 is aligned directly beneath the sprue reamer 500. This sprue reamer 500 is continuously rotated at relatively high speed by motor 502 that normally is continuously energized over switch 520.

With the parts in the aforesaid condition the depression of push button 564 energizes winding 565 of solenoid valve SV11, this valve now admits pressure fluid from line 276 through conduit 555 into the top port 547 of carriage cylinder 508, and this admitted fluid pushes piston 550 down and thereby moves the carriage 504 from the top position of Fig. 12 to the lowermost position of Fig. 13. In so moving down interlock switch 568 is opened to prevent winding 289 of solenoid valve SV4 from being energized. This prevention makes it impossible for carriage cylinder 250 at Station IV to advance the cope 14 beyond position b3 (Fig. 19) until after the sprue reaming operation has been completed.

As the sprue reamer carriage 504 moves down limit switch 558 is closed energizing coil 561 of air valve SV12 and thereby permitting air under pressure (from source 518 of Fig. 21) to blow down through shaft passage 514 into and through the center of reamer 500. Thus initiated this blow down of air through the reamer continues during the entire remainder of the sprue reaming cycle.

As the whirling reamer 500 enters the initially formed opening 23 in the cope flask (see Fig. 13) the slots 513 collect from the sides of the opening any excess sand while the stream of downward air carries this collected sand through the open bottom of the reamer and thence down through the portion of sprue opening 23 therebelow (see Fig. 10). In this way the excess sand around the top portion of opening 23 is effectively removed and discharged downwardly below the bottom of the cope flask 14. As earlier pointed out shield 544 prevents sand from the whirling reamer from flying outwardly over the cope flask top in a manner which might be objectionable were the shield not to be used.

As the reamer carriage cylinder 508 completes its downward stroke (Fig. 13) limit switch 558 is closed for the purpose of energizing winding 566 of solenoid valve SV11. This energization causing the valve to admit pressure fluid into the conduit 554 and thence through bottom port 546 into the lower portion of cylinder 508. Such admitted fluid moves piston 550 upwardly and with it the reamer carriage 504, thereby withdrawing spinning reamer 500 out of the finally shaped and cleaned opening 23.

Once started this upward movement of the reamer carriage continues until the top position shown by Fig. 12 is reached. Two things then happen. The first is the opening of normally closed limit switch 559. Such opening breaks the circuit for winding 561 of valve SV12 and allows spring 562 to reclose the valve thereby shutting off the supply of air to the interior of whirling reamer 500.

The second thing which happens is closure of normally open limit switch 568. Said closure once more sets up the circuit 324 (see Fig. 21) over which winding 289 of solenoid valve SV4 may at proper times be energized over contact 283 of relay RA for the purpose of causing cylinder 250 (Fig. 19) to advance the sprue-reamed cope into the assembling machine 30.

The latter setting up completes the sprue reamer cycle and conditions the facilities of the present invention for another cycle of operations which duplicates the one just described.

*Extended and other systems likewise may be benefitted*

More extended systems likewise may be benefitted by this invention. If desired the complete installation shown by Fig. 1 hereof may be supplemented by cooling loop and cope stripper facilities organized as disclosed by a second copending application Serial No. 232,524, filed June 20, 1951, in the names of John A. Lasater and Thomas A. Deakins with title of "Cope Stripper and Cooling Loop for Mold Assembly Mechanism," now Patent 2,712,703, issued July 26, 1955.

Moreover the installation shown by Fig. 1 hereof may be supplemented at Station V by automatic take off and mold lowering facilities organized as disclosed by a third copending application Serial No. 243,688, filed August 25, 1951, in the names of John A. Lasater and Thomas A. Deakins with title of "Automatic Take Off and Lowering of Assembled Molds from Assembling Mechanism to Conveying Cars."

And it will still further be evident that the same facilities also have comparable utility when applied to any mold assembling installation (non-mechanized as well as mechanized) wherein it is desired that the sprue opening 23 initially formed in the sand of the cope flasks be reshaped and have excess sand removed therefrom before the cope flasks are assembled with cooperating drag flasks into complete molds ready for pouring.

*Summary*

The sprue reaming technique and facilities herein disclosed accordingly have practical utility of a high order and the specific reaming and cleaning functions described therefor are accordingly to be interpreted in an illustrative rather than in a restrictive sense.

It will thus be seen that our invention betters the performance of a complete mold assembling installation either of the aforesaid mechanized type or of the conventional non-mechanized type; that our inventive improvements provide such installations with means for removing surplus sand from the sprue openings in the cope flasks before same are assembled with cooperating drag flasks into complete molds ready for pouring; that in the mechanized installation here disclosed by way of illustration these sprue reaming facilities function in a more or less automatic manner to ream and clean the sprue openings of each cope flask which has been charged with sand preparatory to insertion at Station IV into the mold assembling machine; and that our invention has provided for interlocking the new sprue reaming facilities with the mechanized installation's cope inserting means in such manner that the sprue reaming operation must be fully completed before the sand charged cope flask can be inserted into the assembling machine.

Our inventive improvements are therefore extensive in their adaptation and hence are not to be restricted to the specific form herein disclosed by way of illustration.

What we claim is:

1. In an installation for assembling foundry molds, the combination of means for receiving empty cope flasks and advancing each from a first location into a second location and thereafter into a third location; means at said first location for charging each cope flask arriving thereat with sand and forming therein a sprue opening which extends upwardly through the sand from the cope bottom to the cope top; facilities at said second location adapted to remove excess sand from the said sprue opening of each cope flask arriving thereat and to impart a desired shaping thereto, said facilities comprising a reamer, means supporting said reamer spacedly above each said cope when in said second location and in generally axial alignment with the cope's said sprue opening, said supporting means including a frame member and a carriage member mounted thereon for generally vertical movement, means journaling said reamer to said carriage for rotation about a substantially vertical axis, motor means secured to said carriage member and operatively connected to said last mentioned means for effecting rotation of said reamer, means for lowering said carriage member and consequently said reamer to a position where said reamer projects into the top of said sprue opening to remove therefrom excess sand for dropping through the opening and out of the bottom thereof, and means for thereafter raising said carriage member thereby withdrawing said reamer from said sprue opening to the original position where said reamer is spacedly above the cope; and means thereafter effective to advance from said second location to said third location each cope flask whose sprue opening has been reamed in the manner aforesaid.

2. In a mold assembling installation having apparatus for receiving a prepared cope preparatory to assembling a complete mold, the combination of means for receiving empty cope flasks and conveying the same to said apparatus; means associated with said receiving and conveying means for inserting a tapered sprue pin into each said cope flask, charging said cope flask with sand and withdrawing said pin from the bottom of the thus charged cope flask thereby forming an upwardly tapered sprue opening therein; and means also associated with said receiving and conveying means but at a location between said second mentioned means and said apparatus for reaming out said sprue opening to remove excess sand from said passage, said last mentioned means comprising a rotatably mounted reamer positioned to be substantially coaxial with said sprue passage when said cope flask is at a predetermined location on said receiving and conveying means, said reamer being spacedly supported above said cope and adapted to be moved from said spaced position a predetermined distance into said sprue opening through the top end thereof and thence back to said spaced position, and means for effecting the aforesaid movement.

3. In a mold assembling installation of the type described, mechanism for assembling a complete mold having one position at which the drag flask of said mold is introduced into the mechanism and another position at which the cope flask of said mold is introduced into the mechanism above said drag flask; means for moving said assembling mechanism from said one to said other position; means for receiving sand filled drag flasks and conveying the same into said assembling means at said one position; means for receiving sand filled cope flasks having upwardly tapered sprue openings extending therethrough from the lower to the upper surface thereof; means associated with said cope receiving means effective to ream out said sprue openings from the tops thereof to remove excess sand therefrom including a rotatable reamer movable from a first position spaced from said cope to a second position a predetermined distance within said sprue opening; means for conveying said copes as so reamed from said receiving means into said assembling mechanism at said second position; and interlock means effective to prevent said last mentioned means from operating and said assembling mechanism from moving while said reamer is engaged in reaming the sprue opening of a sand filled cope flask.

4. A semi-automatic reaming device comprising an upright frame member; a support member including a pair of horizontally spaced vertically disposed guide rods carried by the upper end of said frame member; means for effecting horizontal adjustment of said support means with respect to said frame member; a carriage mounted on said support member for movement to and from an upper and a lower position, said carriage comprising a hollow elongated guide member telescoped over each of the vertical guide rods of the support member, means interconnecting said hollow guide members at their extremities; a reamer journaled to said interconnecting means for rotation about a generally vertically axis and a motor secured to said interconnecting means and operatively connected to said reamer to effect rotation thereof; hydraulic motor means secured to the upper end of the support means and operatively connected to said carriage for effecting movement thereof from said upper to said lower position and vice versa; manually actuated control means for effecting operation of said hydraulic motor means to move the carriage from the upper to the lower position; and means engaged by said carriage upon reaching said lower position for effecting operation of the hydraulic motor means to return the carriage to the upper position.

5. A semi-automatic reaming device comprising an upright frame member; a support member including a pair of horizontally spaced vertically disposed guide rods carried by the upper end of said frame member; a carriage mounted on said support member for movement to and from an upper and a lower position, said carriage comprising a hollow elongated guide member telescoped over each of the vertical guide rods of the support member, means interconnecting said hollow guide members at their extremities; a reamer journaled to said interconnecting means for rotation about a generally vertical axis and a motor secured to said interconnecting means and operatively connected to said reamer to effect rotation thereof; hydraulically operated motor means secured to the upper end of the support means and operatively connected to said carriage for effecting movement thereof from said upper to said lower position; an electromagnetically actuated valve operable to control the hydraulic motor means to move the carriage from the upper to the lower position and vice versa; a manually actuable switch associated with said valve operable to control operation of the hydraulic motor means to move the carriage to the lower position; and a switch associated with said valve and actuated by the carriage upon reaching its lowermost position to effect an operation of said hydraulic motor which returns said carriage to said upper position.

6. A semi-automatic reaming device comprising a support member; guide means secured to said support member and extending in a generally vertical direction; a carriage movable along said guide means between a top position and a bottom position; a reamer mounted on and extending downwardly from a lower portion of said carriage for rotation about a generally vertical axis; a motor also mounted on said carriage and connected with said reamer to impart said rotation thereto; a hydraulic cylinder associated with said support member and said carriage and disposed to effect selective movement of the carriage up and down along said guide means between said top and bottom positions; means including a manually actuable switch for initiating admission of pressure fluid to said cylinder in a first direction which produces movement by said carriage from said top position downwardly to said bottom position; and means including a limit switch responsive to arrival by said carriage in said bottom position for initiating admission of pressure fluid to said cylinder in a second direction which produces return movement by said carriage from said bottom position upwardly to said top position.

7. In a mold assembling installation having apparatus for receiving a prepared cope preparatory to assembling a complete mold, the combination of means for receiving empty cope flasks and conveying the same to said apparatus; means associated with said receiving and conveying means for inserting a tapered sprue pin into each cope flask, charging said cope flask with sand and withdrawing said pin from the bottom of the thus charged cope flask thereby forming an upwardly tapered sprue opening therein; means also associated with said receiving and conveying means but at a location between said second mentioned means and said apparatus for reaming out said sprue passage from the top thereof to remove excess sand from said passage, said last mentioned means including a rotatable reamer positioned to be substantially coaxial with said sprue passage when said cope flask is at a predetermined location on said receiving and conveying means and having a centrally disposed passageway therethrough, means for effecting axial movement of said reamer to and from a normally inactive position where said reamer is spaced above said cope and an active position where said reamer projects a predetermined distance downwardly into said sprue passage, and means effective when said reamer is in said active position for blowing a stream of air through the reamer's centrally disposed passageway and accordingly through said sprue opening to insure the complete removal of excess sand therefrom.

References Cited in the file of this patent

UNITED STATES PATENTS

| | | |
|---|---|---|
| 235,191 | Adams | Dec. 7, 1880 |
| 601,512 | Gunn | Mar. 29, 1898 |
| 798,675 | Hall | Sept. 5, 1905 |
| 1,134,396 | McCarte | Apr. 6, 1915 |
| 1,905,490 | Norrick | Apr. 25, 1933 |
| 2,049,967 | Luton | Aug. 4, 1936 |
| 2,229,492 | Christensen et al. | Jan. 21, 1941 |
| 2,335,004 | Garrison | Nov. 23, 1943 |
| 2,347,346 | Wright | Apr. 25, 1944 |